(12) United States Patent
Yarabolu

(10) Patent No.: US 11,405,211 B2
(45) Date of Patent: Aug. 2, 2022

(54) BIOMETRIC SESSION TOKENS FOR SECURE USER AUTHENTICATION

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 421 days.

(21) Appl. No.: 16/736,343

(22) Filed: Jan. 7, 2020

(65) Prior Publication Data
US 2021/0211288 A1 Jul. 8, 2021

(51) Int. Cl.
*H04L 9/32* (2006.01)
*H04L 9/40* (2022.01)

(52) U.S. Cl.
CPC ........ *H04L 9/3231* (2013.01); *H04L 63/0861* (2013.01)

(58) Field of Classification Search
CPC .............. H04L 9/3231; H04L 63/0861; H04L 63/0428; H04L 63/12; H04L 9/3239
See application file for complete search history.

(56) References Cited

U.S. PATENT DOCUMENTS

| | | | |
|---|---|---|---|
| 7,623,659 B2 | 11/2009 | Huang et al. | |
| 8,707,410 B2 | 4/2014 | Miller et al. | |
| 9,444,620 B1 | 9/2016 | Murphy et al. | |
| 9,779,423 B2 | 10/2017 | Turgeman | |
| 10,326,761 B2 | 6/2019 | Yang | |
| 2002/0124176 A1* | 9/2002 | Epstein | G06Q 20/341 713/168 |
| 2018/0101847 A1 | 4/2018 | Pisut, IV | |
| 2019/0190718 A1* | 6/2019 | Wease | H04L 9/3242 |
| 2020/0162455 A1* | 5/2020 | Lin | H04W 12/47 |
| 2022/0029799 A1* | 1/2022 | Subudhi | H04L 9/0866 |

OTHER PUBLICATIONS

Soutar, C., Roberge, D., Stoianov, A., Gilroy, R., & Kumar, B. V. (Mar. 1998). Biometric Encryption: enrollment and verification procedures. In Optical Pattern Recognition IX (vol. 3386, pp. 24-35). SPIE. (Year: 1998).*

* cited by examiner

*Primary Examiner* — Alexander Lagor
(74) *Attorney, Agent, or Firm* — Banner & Witcoff, Ltd.

(57) ABSTRACT

Communications between a client and an application server can be authenticated based on biometrics information about a user. After basic client authentication by the application server, the application server queries a biometrics server that has user biometrics information. The biometrics server provides the biometrics information to the application server in the form of a hash and the application server stores it in an application database for future comparison. The application server sends an unencrypted token to the client. The client queries biometrics information from the biometrics servers, which is provided in a hash. The client uses the biometrics information to encrypt the unencrypted token received from the application server and sends the encrypted token to the application server for validation. The application server hashes the encrypted token received from the client and compares it to the hash stored in the application database. If the hashes match, the communications are authenticated. The process can be repeated for subsequent tokens until the customer logs out.

20 Claims, 9 Drawing Sheets

BIOMETRIC SESSION TOKENS FOR SECURE USER AUTHENTICATION

TECHNICAL FIELD OF DISCLOSURE

The present disclosure relates to processes and machines for securely authenticating users. In particular, the disclosure pertains to the use of dynamic biometrics tokens for a user and encryption to facilitate secure communications over "network(s)" between "computer machine(s)" and/or "computer software and data" as those terms are defined herein.

BACKGROUND

More and more "computer machines" and "computer software and data" are communicating with one another over unsecure "network(s)." As an example, client applications operating on computer machines typically communicate with other computer machines, such as servers, over the Internet. Another example is when consumers purchase products and services over electronic networks such as, for example, the Internet. These types of communications must be secure. Not only must systems be able to authenticate all applicable users and computer machines involved in transactions, but all traffic therebetween must be secure.

Before a server renders services to a user or client, the server will typically request the user's user credentials in order to authenticate the user. Merely requiring usernames and passwords is often insufficient to completely authenticate and secure the transactions. This because hackers can utilize attacks, such as man-in-the-middle attacks (MITM), to cause security problems between point-to-point communications between one computer machine and another.

In cryptography and computer security, a MITM is an attack where the attacker secretly relays and possibly alters the communications between two parties who believe they are directly communicating with each other. One example of a MITM attack is active eavesdropping, in which the attacker makes independent connections with the victims and relays messages between them to make them believe they are talking directly to each other over a private connection, when in fact the entire conversation is controlled by the attacker. The attacker must be able to intercept all relevant messages passing between the two victims and inject new ones. This is straightforward in many circumstances; for example, an attacker within reception range of an unencrypted wireless access point could insert themselves as a man-in-the-middle.

As it aims to circumvent mutual authentication, a MITM attack succeeds when the attacker impersonates each endpoint sufficiently well to satisfy their expectations. As an example of a MITM attack, suppose a first computer, application or user (e.g., Alice) wishes to communicate with a second computer, application or user (e.g., Bob). Meanwhile, an attacker (e.g., Mallory) wishes to intercept the conversation to eavesdrop and optionally to deliver a false message to Bob.

First, Alice asks Bob for his public key. If Bob sends his public key to Alice, but Mallory is able to intercept it, an MITM attack can begin. Mallory sends Alice a forged message that appears to originate from Bob, but instead includes Mallory's public key.

Alice, believing this public key to be Bob's, encrypts her message with Mallory's key and sends the enciphered message back to Bob. Mallory again intercepts, deciphers the message using her private key, possibly alters it if she wants, and re-enciphers it using the public key she intercepted from Bob when he originally tried to send it to Alice. When Bob receives the newly enciphered message, he believes it came from Alice.

A session token or cookie is usually generated after successful authentication and will be exchanged between clients and servers throughout customer sessions. The session tokens are prone to hijacking using these MITM attacks. Attackers can also simulate the session generation algorithm as it is the same algorithm used to generate session tokens for all the customers. In the above cases, the attacker can use the captured token directly as it is the same token server expects.

This example shows the need for Alice and Bob to have some way to ensure that they are truly each using each other's public keys, rather than the public key of an attacker. Otherwise, such MITM attacks are generally possible, in principle, against any message sent using public-key technology.

The disclosure addresses one or more of the shortcomings in the industry, thus improving the operational authentication and cybersecurity of secure communications over "network(s)" between "computer machine(s)" and/or "computer software and data" by use of dynamic biometrics tokens.

SUMMARY

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of the disclosure or to delineate the scope of the disclosure. Instead, as would be understood by a personal of ordinary skill in the art, the following summary merely presents some concepts of the disclosure in a simplified form as a prelude to the more detailed description provided below.

In one general aspect of this disclosure, a system of one or more computer executable software and data, computer machines and components thereof, networks, and/or network equipment can be configured to perform particular operations or actions individually, collectively, or in a distributed manner to cause the system or components thereof to authenticate communications between a client and server.

As used throughout this disclosure, computer-executable "software and data" can include one or more: algorithms, applications, databases (e.g., application databases and biometrics databases) datasets (e.g., digital wallets and biometrics datasets), drivers, data structures, encryptions, firmware, graphical user interfaces, hashes, instructions, machine learning, middleware, modules, objects, operating systems, processes, protocols, programs, scripts, tools (e.g., for facilitating secure communications) and utilities. The computer-executable software and data is stored in tangible, non-volatile, computer-readable memory (locally or in network-attached storage) and can operate autonomously, on-demand, on a schedule, and/or spontaneously.

As used herein, a hash value (or simply hash), also called a message digest, is a number generated from a string of text. The hash is substantially smaller than the text itself and is generated by a formula in such a way that it is extremely unlikely that some other text will produce the same hash value. Hashes play a role in security systems such as in this disclosure where they are used to ensure that transmitted messages have not been tampered with. The sender generates a hash of the message, encrypts it, and sends it alone or with the message itself. The recipient then decrypts both the message and the hash, produces another hash from the received message, and compares the two hashes. If they are the same, there is a very high probability that the message was transmitted intact. Persons of skill in the art will recognize that any form of hash or hash algorithm could be used to implement one or more aspects of this disclosure.

"Computer machines" can include one or more: general-purpose or special-purpose network-accessible personal computers, desktop computers, laptop or notebook computers, clients, distributed systems, workstations, portable electronic devices, smart devices, smart phones, smart watches, multifunction devices, and/or servers having one or more microprocessors for executing or accessing the computer-executable software and data. Computer machines also includes all hardware and components typically contained therein. The "servers" can be virtual or physical, on-premise or remote, and can include one or more: application servers, biometrics servers, cybersecurity servers, and/or web servers for executing, accessing, and/or storing the computer-executable software and data.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of any of the same. Networks also include associated "network equipment" such as access points, ethernet adaptors (physical and wireless), cellular modems, firewalls, hubs, modems, routers, and/or switches located inside the network and/or on its periphery, as well as software executing on any of the foregoing.

In a general aspect of the disclosure, computer-executable software on a client, application server, and biometrics server can be used to authenticate communications between the client and application server based on biometrics information about a user that is stored in a biometrics server. After basic client authentication by the application server, the application server can query the biometrics server that has the biometrics information. The biometrics server can provide the biometrics information to the application server in the form of a hash and the application server can store it in an application database for future comparison. The application server can send an unencrypted token to the client. The client can query biometrics information from the biometrics server, which can be provided in a hash. The client can use the biometrics information to encrypt the unencrypted token received from the application server and can send the encrypted token to the application server for validation. The application server can hash the encrypted token received from the client and compare it to the hash stored in the application database. If the hashes match, the communications are authenticated. The process can be repeated for subsequent tokens until the customer logs out.

In another aspect of the disclosure, an authentication process can authenticate communications between a user using a client application and an application server over a network coupled to a biometrics server. A biometrics server can generate a unique hash based on biometrics information relating to the user. The biometrics server can send the unique hash to the client and the application server. The application server can send an unencrypted token to the client. The client can encrypt a first encrypted token using the unique hash and the unencrypted token provided by the application server. The client can send the first encrypted token to the application server. The application server can encrypt a second encrypted token using the unique hash and the unencrypted token. The application server can compare the first encrypted token to the second encrypted token. If the first encrypted token matches the second encrypted token, the communications are authentic and communications between the client and the application server are allowed to proceed. If the tokens do not match, the communications can be rejected by the application server.

In a further aspect of the disclosure, a biometrics session token generating process can be used to secure communications between a client and application server by use of a biometrics server. A client application can receive credentials from a user. The client application can provide the credentials plus a client secret to the application server. The application server can perform authentication based on the credentials and the client secret. The application server can generate an unencrypted token. The application server can send the unencrypted token to the client application. A user device can generate biometrics information regarding the user. The user device can generate this information itself or can generate it based on information from a smart device such as a smart watch worn by the user. The user device can send user identification information and biometrics information to a biometrics server. The application server can submit a query to the biometrics server and the query can contain the client secret. The biometrics server can provide hashed data based on the biometrics information to the application server. The application server can encrypt the unencrypted token with the hashed data into a first encrypted token. The client application can encrypt the unencrypted token with the hashed data into a second encrypted token. The client application can send the second encrypted token to the application server. The application server can compare the first encrypted token and the second encrypted token. If the first encrypted token matches the second encrypted token, the communications are authenticated and communications between the client and the application server are allowed to proceed. If the tokens do not match, the communications can be rejected by the application server.

In various aspect of the disclosure, process steps can be stored as computer-executable instructions in at least one tangible, non-transitory computer-readable medium. A user may have a user device, such as a smart phone. The smart phone may collect or receive wellness data about the user. The wellness data may be obtained by a wearable device such as a smart watch worn by the user. The user device can provide the wellness data to the biometrics server. The biometric server can use the wellness data to create biometrics information.

In yet another aspect of the disclosure, an authentication machine can authenticate communications between a user using a client and an application server based on information received from a biometrics server. An application server can be coupled to the network. The application server can contain a tangible, non-transitory computer-readable medium storing computer-executable instructions and a computer processor for executing said instructions stored thereon. Unique hash receiving instructions can be stored on the computer-readable medium in order to receive a unique hash from the biometrics server. The unique hash can be based on biometrics information relating to the user. Unencrypted token instructions can be stored on the computer-readable medium in order to generate an unencrypted token and send the unencrypted token to the client. Encryption receiving instructions can be stored on the computer-readable medium in order to receive a first encrypted token from the client. The first encrypted token can be encrypted based on the unique hash and the unencrypted token. Encryption generating instructions can be stored on the computer-readable medium in order to generate a second encrypted token using the unique hash and the unencrypted token. Comparison instructions can be stored on the computer-readable medium in order to compare the first encrypted token and the second encrypted token. Authentication instructions can be stored on the computer-readable medium in order to authenticate the communications if the first encrypted token and the second encrypted token match. An application database can be used to store the unique hash received from the biometrics server in order to facilitate future comparisons.

Implementations of various aspects of this disclosure regarding authentication can vary depending on the preferences of system engineers and programs, all of which would be within the knowledge of a person of ordinary skill in the art and could be implemented by such a person without undue experimentation by using custom and/or commercially available software. Although specific types of authentication and have been suggested for certain aspects of the disclosure, other types can be substituted without departing from the spirit of the invention contained in this disclosure and all are considered within the scope of the invention and claims.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
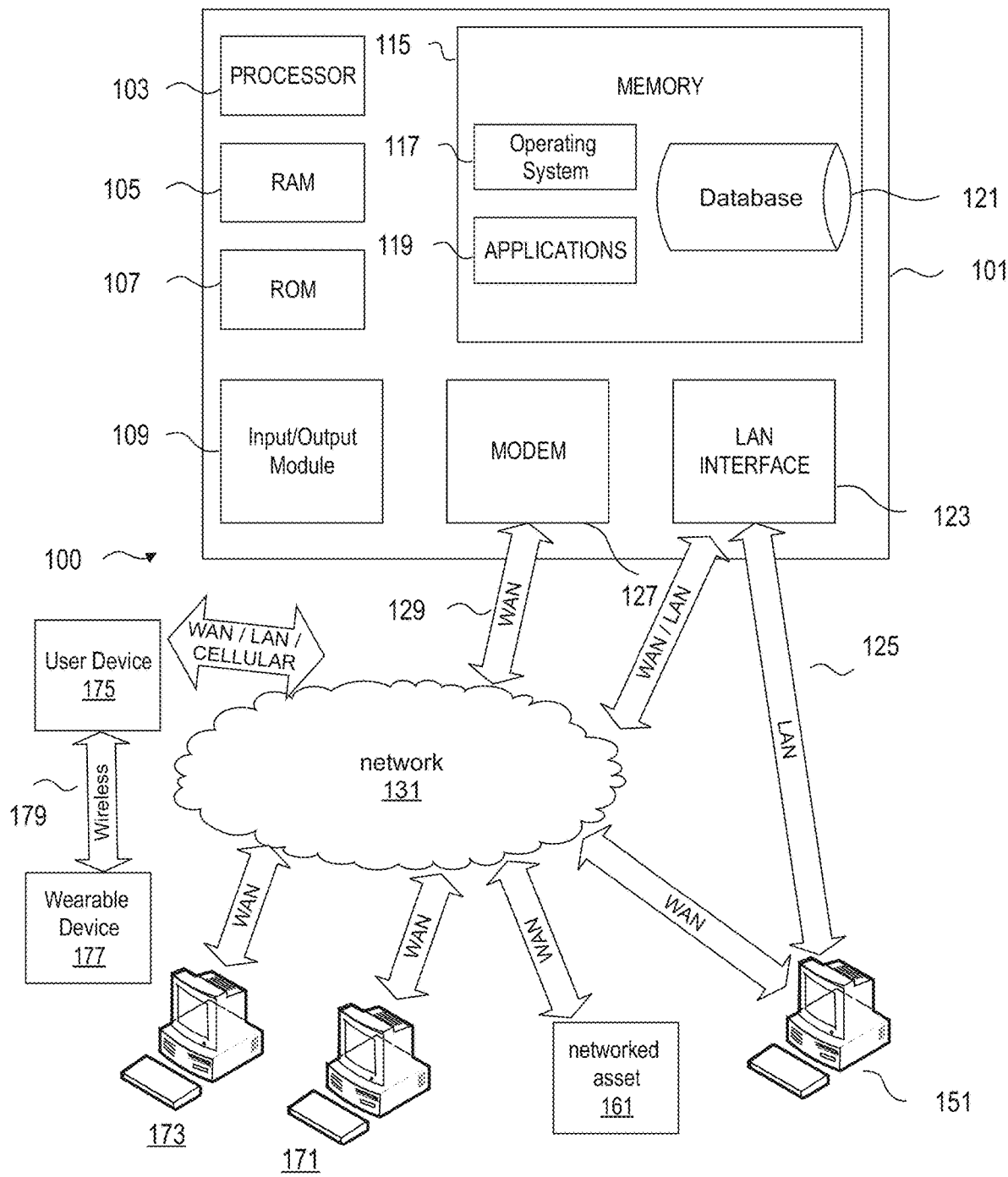
FIG. 1 illustrates a schematic diagram of a digital computing environment in which certain aspects of the present disclosure may be implemented.

FIG. 1 illustrates a system block diagram of a specific programmed computer machine 101 that may be used in whole or in part according to various illustrative embodiments of the disclosure. Each computer machine (e.g., 101, 151, 171, 173, 175) may have one or more processors 103 (not shown for 151, 171, 173, 175) for controlling overall operation of the machine and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to or communicate with device 101 also may be included. I/O may also be sent wirelessly 179 such as, by Bluetooth, WiFI, cellular, etc. from a wearable device 173, such as a smart watch, to a computer machine 175, such as a smart phone user device, Computer software and data may be stored within memory 115 and/or storage to provide computer-readable instructions to exemplary processor 103 for enabling server 101 to perform various technologic functions and to access data. For example, memory 115 may store computer software and data used by the server 101, such as an operating system 117, application programs 119, and an associated database 121, such as an application database. Alternatively, an application database may be accessible from a network 131. Some or all of computer machine 101 computer-executable instructions or applications may be embodied in hardware or firmware (not shown).

The computer machine 101 may operate in a networked environment supporting connections to one or more remote computers, such as terminal 151, networked asset 161, biometrics server 171, application server 173, user device 175, and/or wearable device 177. The terminal 151, biometrics server 171, application server 173, and user device 175 may be any type of computer machine such as servers, personal computers, smart phones, etc. that include many or all of the elements described above relative to the exemplary computer machine 101. The networked asset 161 may be similar to terminal 151, or may be a database server device, an application server device, a web server device, a firewall device, wellness partner, or any other computerized asset or computer machine in communication with the network 131. In one example, networked asset 161 may be a software application operating on a terminal device 151; the software application may be a smartphone application or may be a web browser-based application. Computer machine 101, terminals 151, user device 175, wearable device 177, and/or networked asset 161 may also be mobile terminals including various other components, such as a battery, speaker, and antennas (not shown).

The network connections depicted in FIG. 1 include LAN(s), WAN(s), and wireless connections such as 125, 129, and 179 but may also include other networks on interfaces. When used in a LAN networking environment, the computer 101 is connected to the LAN 125 through a network interface or adapter 123. When used in a WAN networking environment, the computer machine 101 may include a modem 127 or other means for establishing communications over the WAN 129, such as the network 131 (e.g., Internet). The computer machine 101 may also use a LAN interface 123 to access a WAN or the Internet. The computer machine 101 or user device 175 may also be connected wirelessly to a wearable device 177, such as a smart watch or other biometric monitoring device. The wireless connection 179 may be Bluetooth, Wi-Fi, cellular, or any other wireless protocol or methodology. It will be appreciated that the network and wireless connections shown are illustrative and other means of establishing a communications link between the computers may be used. The existence of any of various protocols such as TCP/IP, Ethernet, FTP, HTTP, Bluetooth, Wi-Fi, cellular, and the like is presumed.

The disclosure is operational with numerous other general-purpose or special-purpose computing system environments, configurations, machines, and processes, as broadly and non-exhaustively defined in the summary of the invention with respect to computer-executable software and data, computer machines, and networks.

Figure 2:
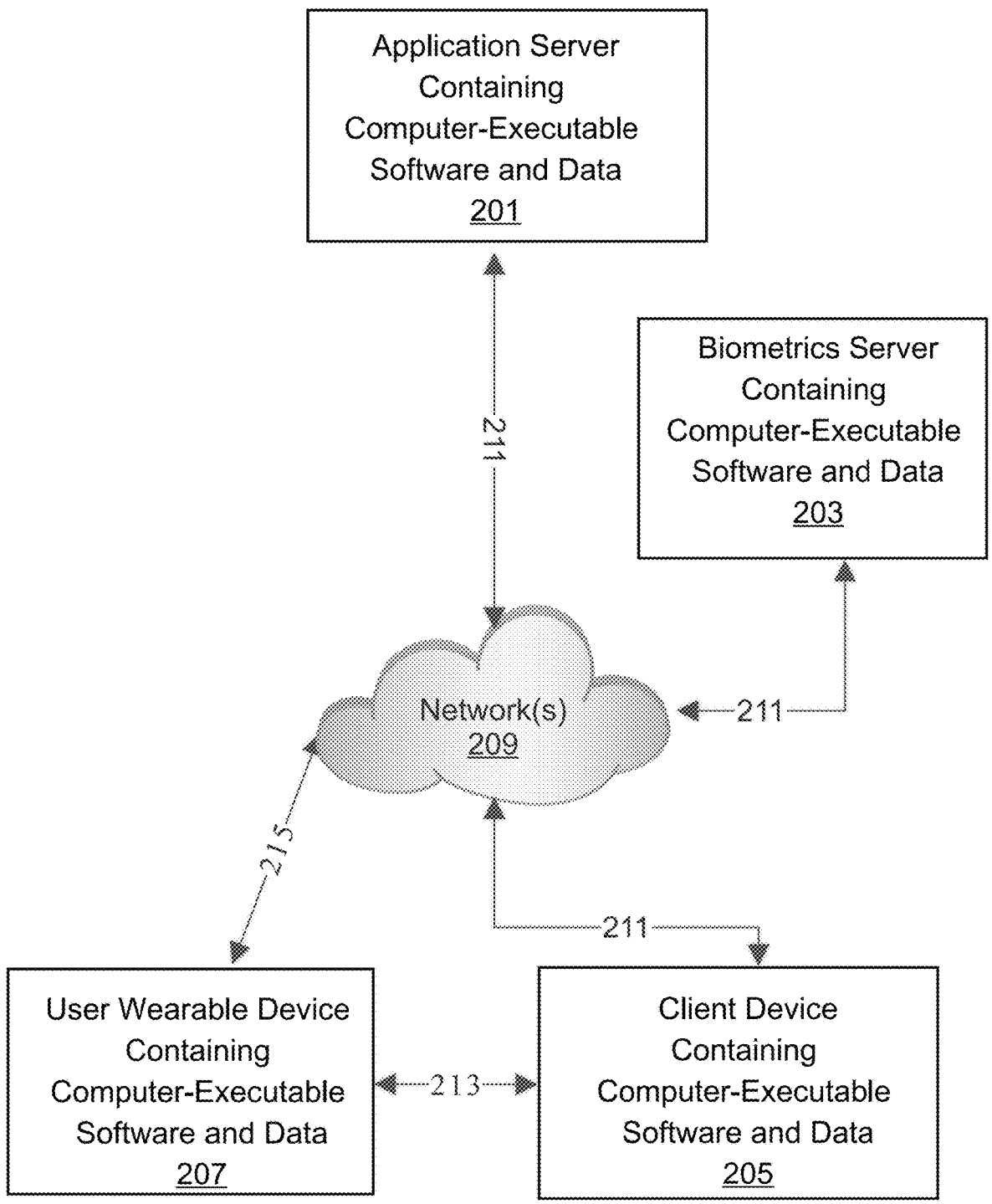
FIG. 2 is an illustrative system for implementing machines and processes according to the present disclosure.

Referring to FIG. 2, an illustrative system for implementing machines and processes according to the present disclosure is shown. As illustrated, the system may include one or more computer machines 101 including, for example, an application server 201, biometrics server 203, client device 205, and user wearable device 207, each of which may contain local and/or remote computer-executable software and data. The application server 201, biometrics server 203, and client device 205 can all be coupled together via network 209 by one or more WAN(s) and/or LAN(s) collectively, 211.

Client device 205 may be a computer machine including, but not limited to, a smart phone, notebook computer, or other mobile device. Client device 205 can connect wirelessly to user wearable device 207 via link 215, which may be any form of wireless connection such as Bluetooth, Wi-Fi, etc. Alternatively, user wearable device 207 may connect via a cellular connection 215 through network 209 to client device 205 and/or application server 201 and biometrics server 203.

Figure 3:
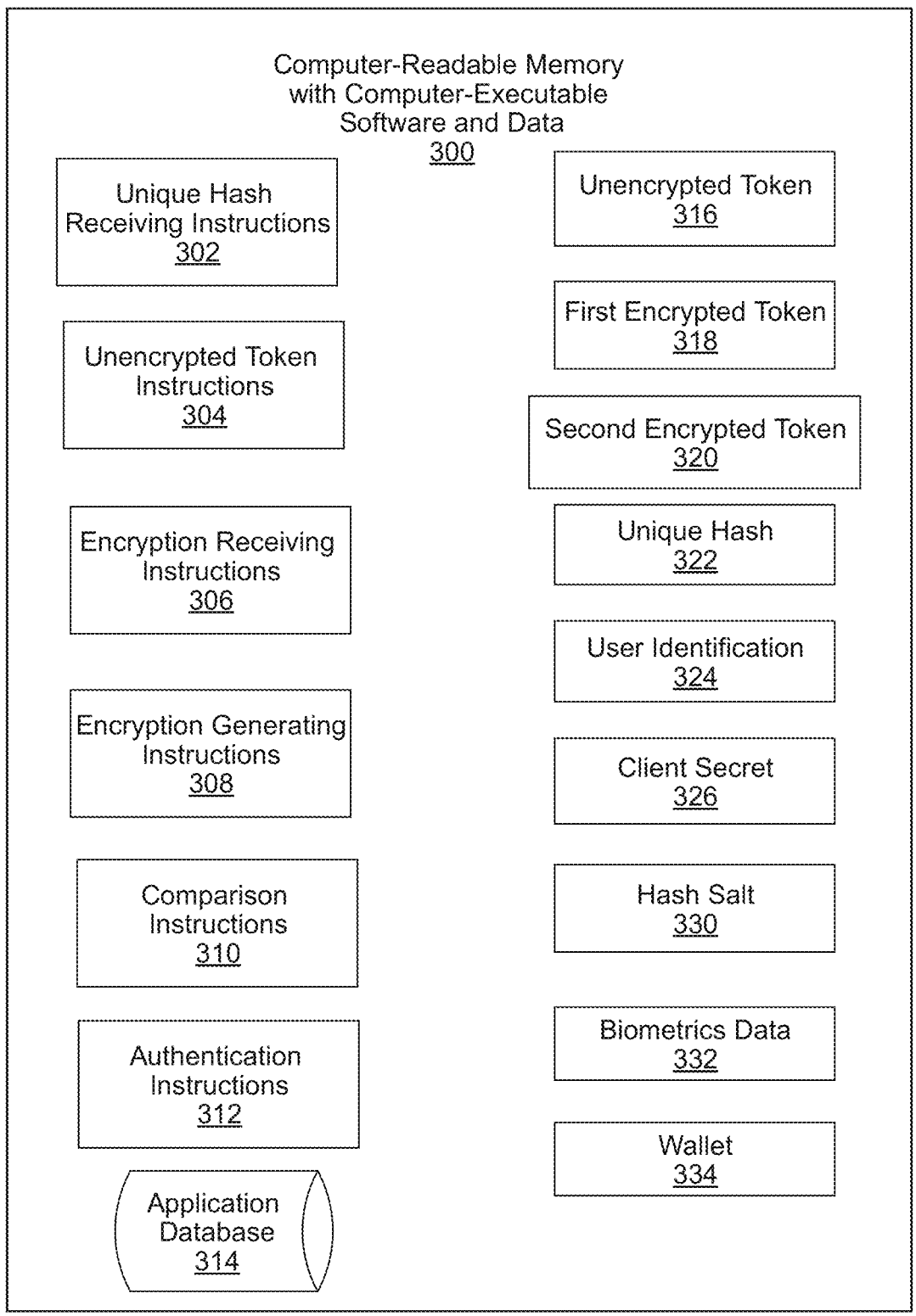
FIG. 3 illustrates exemplary computer-readable memory 300 storing various computer software and data used in accordance with aspects of the disclosure.

FIG. 3 illustrates exemplary computer-readable memory 300 storing various computer software and data used in accordance with aspects of the disclosure. This includes unique hash receiving instructions 302 to receive a unique hash from the biometrics server 203, unencrypted token instructions 304 for generating an unencrypted token 316 and sending the unencrypted token 316 to the client device 205, encryption receiving instructions 306 for receiving a first encrypted token 318 from the client device 205, encryption generating instructions 308 for generating a second encrypted token 320 using the unique hash 322 and the unencrypted token 316, comparison instructions 310 for comparing the first encrypted token 318 and the second encrypted token 320, authentication instructions 312 for authenticating the communications if the first encrypted token and the second encrypted token match, and application database 314 for storing biometric information, tokens, or hashes for comparison purposes. User identification information and/or user credentials 324, a client secret 326 (such as a password or key), a hash salt 330, and biometrics data 332 can be entered or store on computer-readable memory 300 as well. One or more of the foregoing can also be stored in a digital wallet 334 or database located on the computer-readable memory 300 too.

Figure 4:
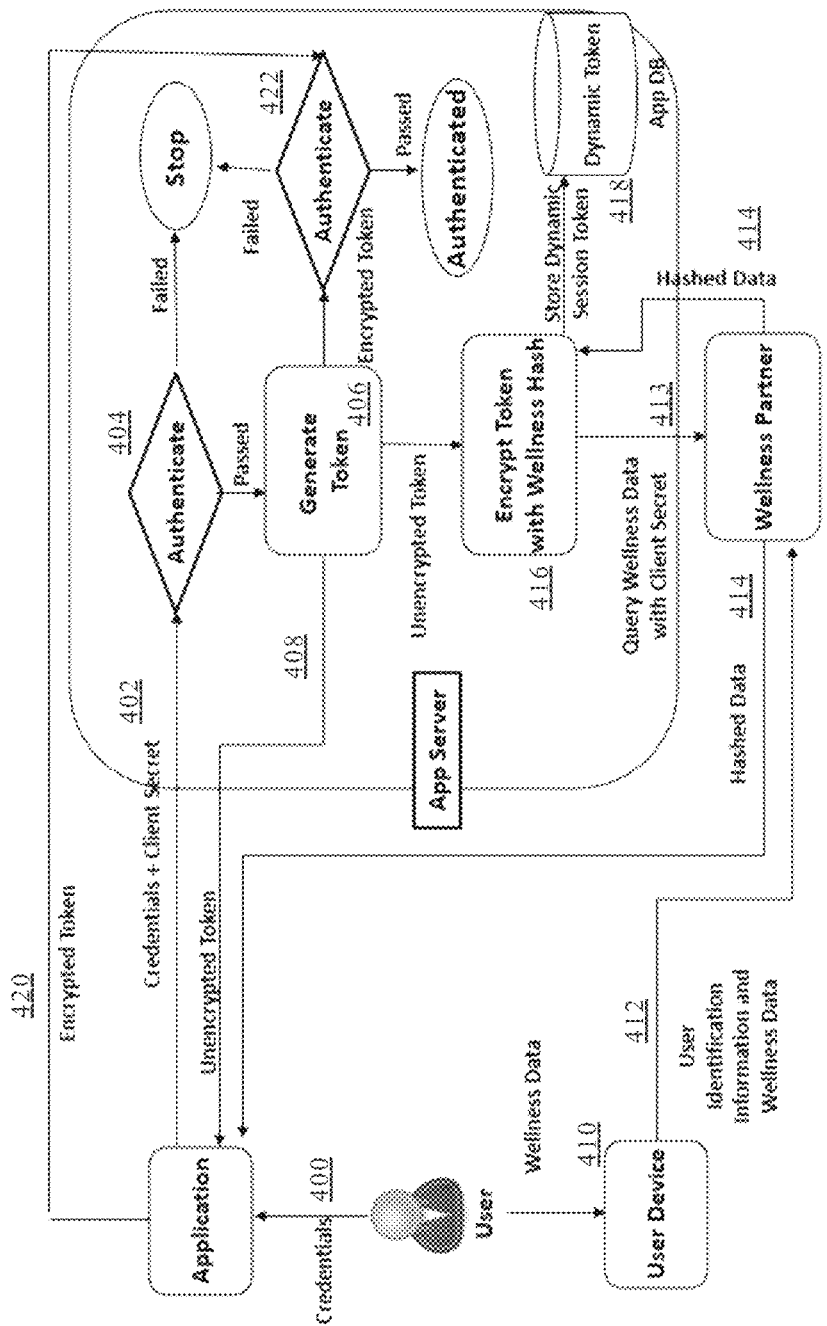
FIG. 4 is an illustrative flowchart of a machine and biometric session token generation process using wellness data and/or biometrics information for authentication over a network performed in accordance with one or more implementations of the present disclosure.

FIG. 4 is an illustrative flowchart of a machine and biometric session token generation process using wellness data and/or biometrics information for authentication over a network performed in accordance with one or more implementations of the present disclosure.

In step 400, a user can provide credentials to an application on a client. In step 402, the credentials and a client secret can be provided to an application server to perform basic authentication in step 404. If authentication in step 404 fails, the process stops. If basic authentication passes, an unencrypted token is generated in step 406. The unencrypted token is provided to the application on the client in step 408.

Wellness data and/or other biometrics information is collected in step 410 from the user and provided to a user device, such as a smart phone. The wellness data and/or biometrics information can be provided to the user device by a smart watch or other user wearable device. The application can be running on the user device or another computer machine. In step 412, user identification information and wellness data and/or other biometrics information is sent to a wellness partner and/or biometrics server. In step 413, the application server queries the wellness partner based on client identification information and the client secret.

In step 414, the wellness partner and/or biometrics server provides hash data corresponding to the wellness data and/or other biometrics information to the client application and the application server.

In step 416, the application server encrypts the unencrypted token with the hashed data from the wellness partner and/or biometrics server. The resulting dynamic session token is stored in step 418 in an application database for comparison purposes.

In step 420, the client application encrypts a token based on the unencrypted token from the application server and the hashed data from the wellness partner and/or biometrics server, and sends the encrypted token to the application server.

In step 422, the application server compares the encrypted token that it generated with the encrypted token from the client application. If the tokens match, the communications have been authenticated. If the tokens do not match, the communications are not authentic, and the communications are rejected and/or stopped. The process can be repeated for subsequent tokens until the customer logs out.

Figure 5:
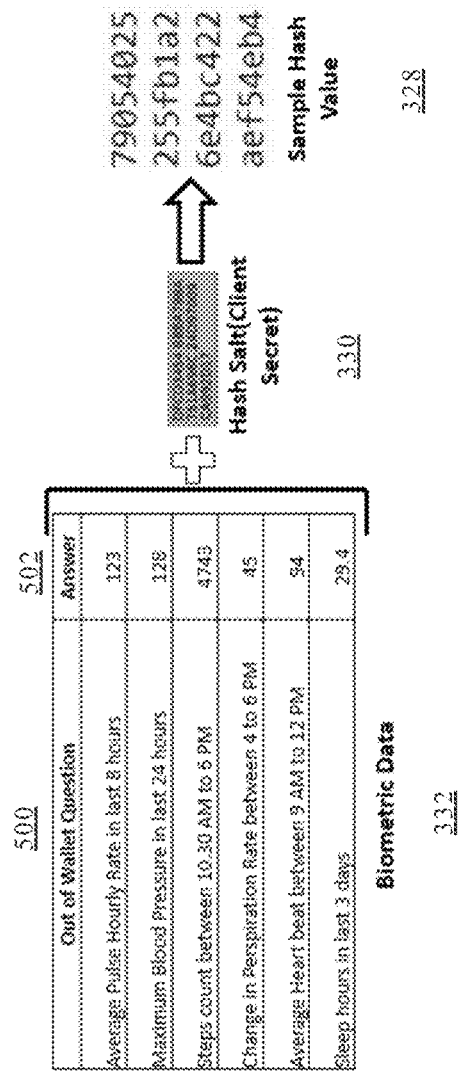
FIG. 5 illustrates a token generation process for getting a wellness hash using out of wallet questions.

FIG. 5 illustrates a token generation process for getting a wellness hash using out of wallet questions. Biometrics data 332 can be stored in a digital wallet 334 and can include a variety of variables such as, for example, the average pulse hourly rate within the last 8 hours, the maximum blood pressure in the last 24 hours, the steps count between 10:30 am and 6 pm, the change in perspiration rate between 4 pm and 6 pm, the average heart beat between 9 am and 12 pm, and the sleep hours in the last 3 days. Each of these variables will have a corresponding answer. Any type of wellness data may be collected from the user wearable device and stored as biometric data 332. The biometric data 332 may be stored as a pseudo wallet or database on a computer machine such as, for example, on a client user device. The wallet can be queried to select one or more questions 500 and their corresponding answers 502, both of which can be stored in the wallet. One or more questions 500 and/or answers 502 can be used in conjunction with the client secret or hash salt 330 in order to create unique hash, such as the sample hash value 328.

Figure 6:
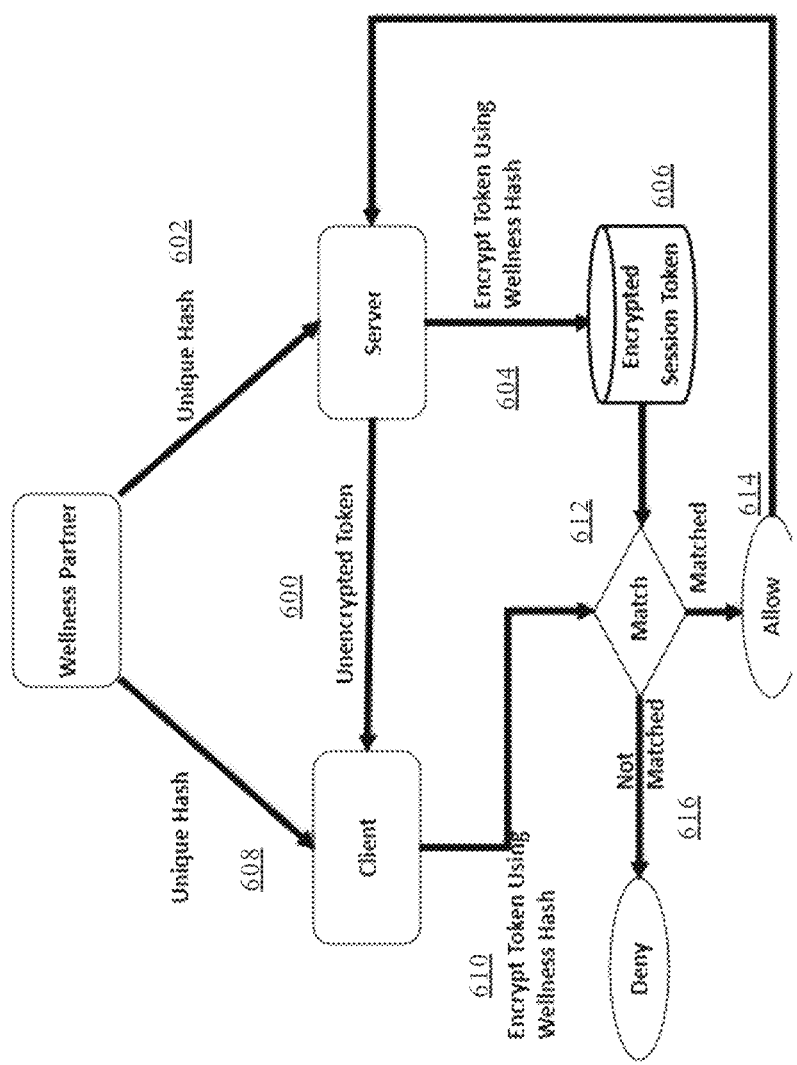
FIG. 6 is an illustrative authentication process using dynamic biometric session tokens.

FIG. 6 is an illustrative authentication process using dynamic biometric session tokens. In step 600, a server sends an unencrypted token to a client. In step 602, a wellness partner using a biometrics server or other computer machine sends a unique hash to the server. In step 604, the server encrypts the token a wellness hash. The wellness hash is stored in memory such as an application database in 606. In step 608, the wellness partner also sends the unique hash to a client. The client encrypts the unencrypted token using the wellness hash in step 610. The encrypted token from the server and the encrypted token from the client are then compared in 612. If the tokens match, the server allows the communications in step 614. If the tokens do not match, the server denies the communications in step 616. The process can be repeated indefinitely if desired.

Figure 7:
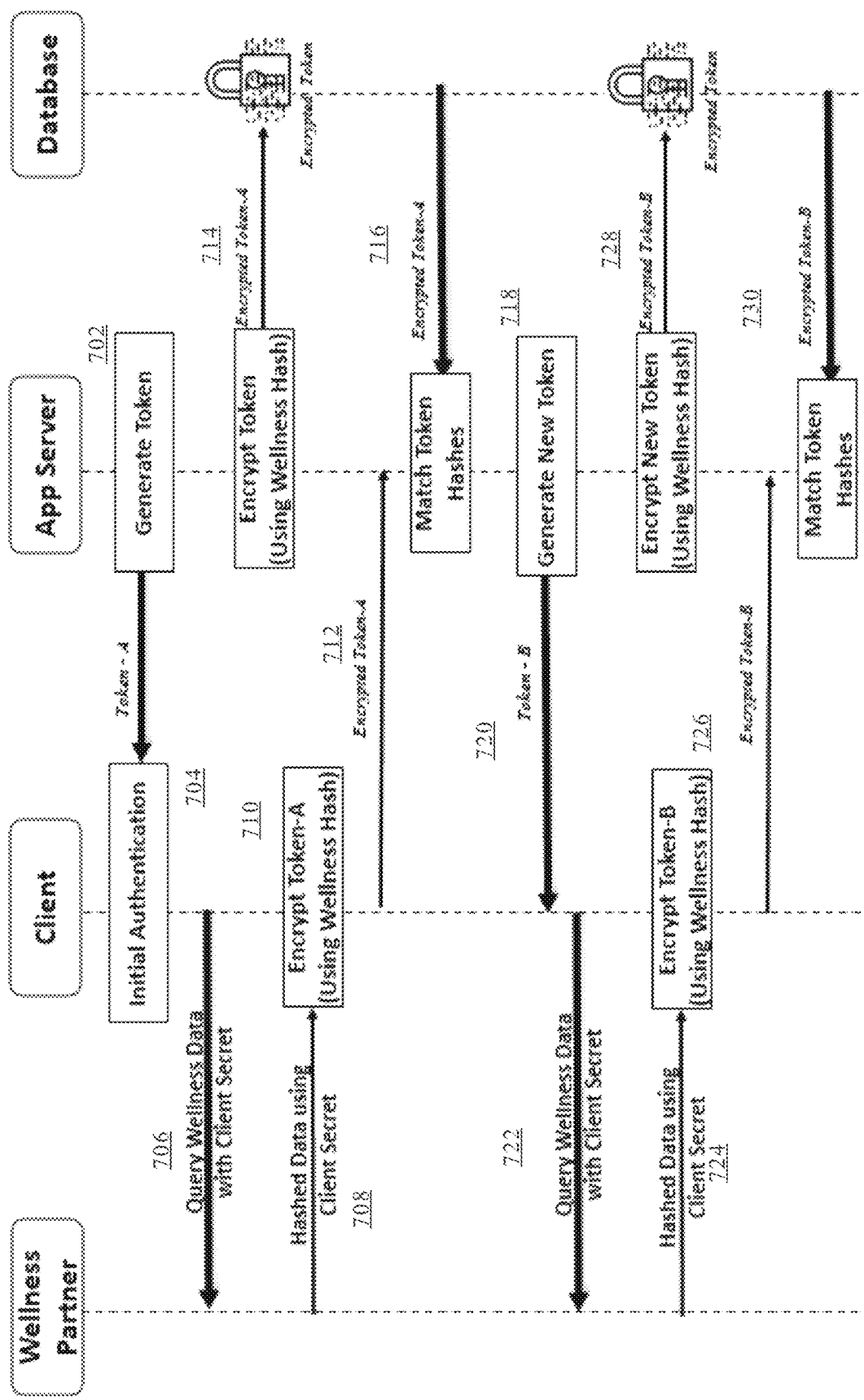
FIG. 7 is another illustrative authentication process using dynamic biometric session tokens.

FIG. 7 is another illustrative authentication process using dynamic biometric session tokens. An application server generates a token (i.e., Token-A) in step 702. Token-A is sent to the client to perform initial authentication in step 704. The client queries in the wellness partner with a client secret in step 706. The wellness partner responds with hashed data using the client secret in step 708. The client encrypts Token-A using a wellness hash in step 710. The Encrypted Token-A is sent from the client to the application server in step 712 and is stored in a database in step 714. Encrypted Token-A can be retrieved from the database on demand to determine if the token hashes match in step 716.

An application server generates a token (i.e., Token-B) in step 718. Token-B is sent to the client in step 720 and forwarded to the wellness partner in step 722 to query wellness data with the client secret. Hashed data using the client secret is returned to the client in step 724. Token-B is encrypted using the wellness hash and sent to the application server in step 726. The application server encrypts Token B and stores Encrypted Token-B in the database in step 728. Encrypted Token-B can be retrieved from the database on demand to determine if the token hashes match in step 730.

Figure 8:
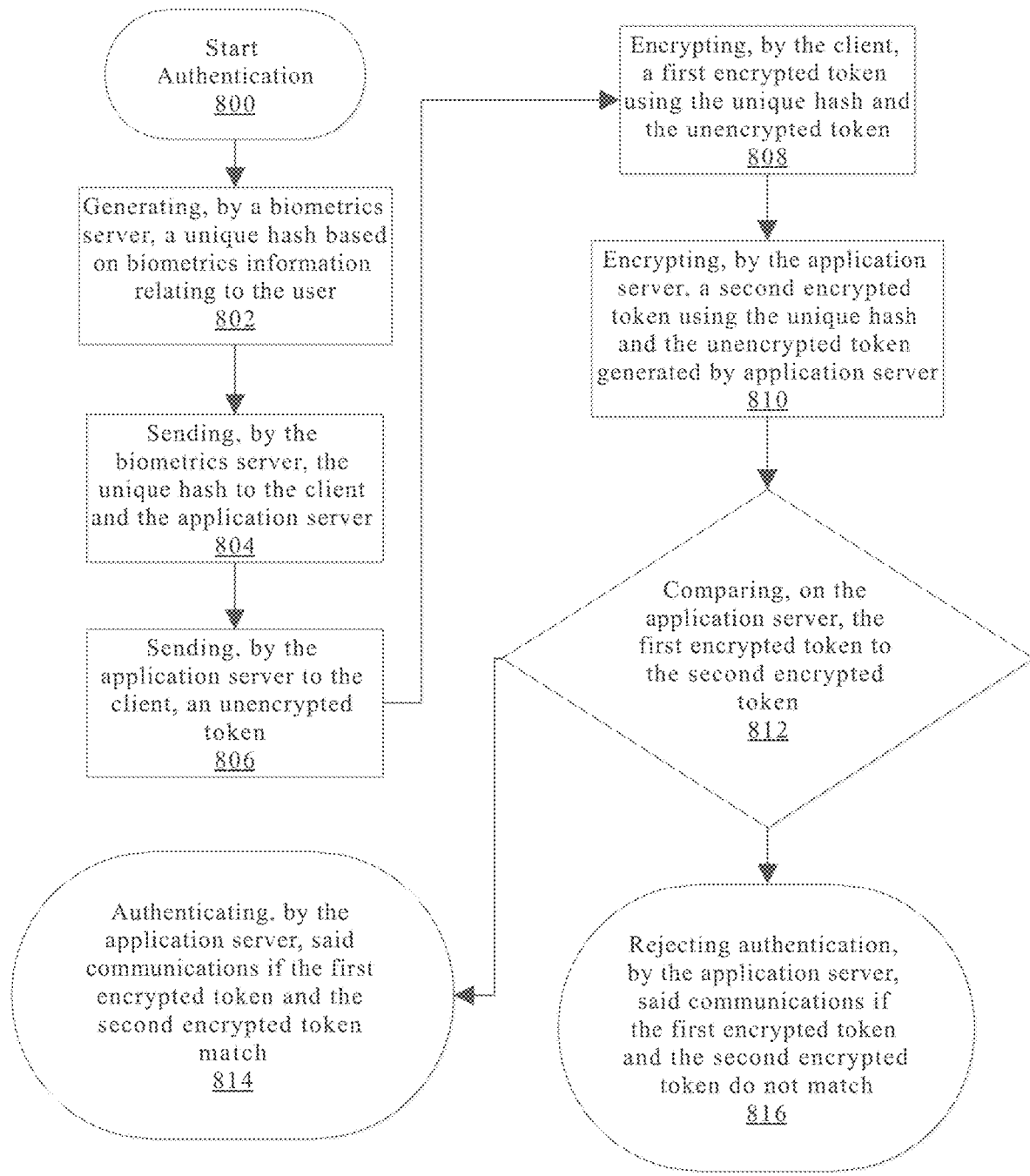
FIG. 8 is an illustration of a process for authenticating communications between a user using a client and an application server over a network coupled to a biometrics server.

FIG. 8 is another illustration of a process for authenticating communications between a user using a client and an application server over a network coupled to a biometrics server. After starting the authentication process in step 800, a biometrics server generates a unique hash based on biometrics information relating to the user in step 802. The biometrics server sends the unique hash to the client and the application server in step 804. The application server sends an unencrypted token to the client in step 806. The client encrypts a first encrypted token using the unique hash and the unencrypted token in step 808. The client sends the first encrypted token to the application server in step 810. The application server encrypts a second encrypted token using the unique hash and the unencrypted token generated by application server in step 812. The application server then compares the first encrypted token to the second encrypted token in step 812. If the tokens match, the communication is authentic and the server allows the connection step 814; otherwise, the server rejects the communication if the tokens do not match in step 816.

Figure 9:
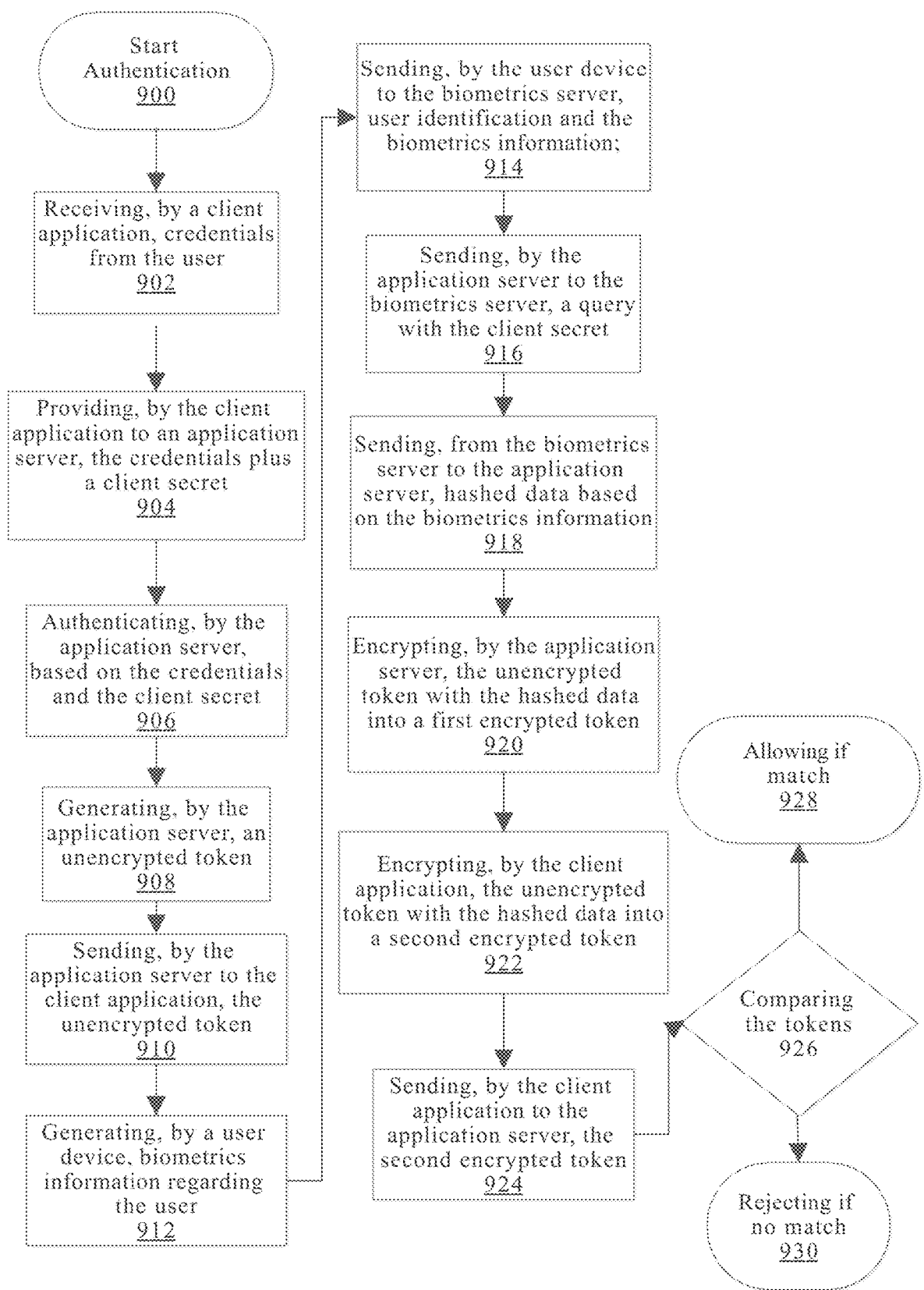
FIG. 9 is an illustrative biometrics session token generating process for securing communications with a user.

FIG. 9 is a further illustrative biometrics session token generating process for securing communications with a user. After starting the authentication process in step 900, a client application receives credentials from the user in step 902. The client application provides the credentials plus a client secret to an application server in step 904. The application server performs authentication based on the credentials and the client secret in step 906. The application server generates an unencrypted token in step 908 and sends the unencrypted token to the client application in step 910. A user device generates biometrics information regarding the user in step 912. The user device sends user information and biometrics information to the biometrics server in step 914. The application server sends a query with a client secret to the biometrics server in step 916. The biometrics server sends hashed data based on the biometrics information to the application server in step 918. The application server encrypts the unencrypted token with the hashed data into a first encrypted token in step 920. The client application encrypts the unencrypted token with the hashed data into a second encrypted token in step 922 and sends it to the application server in step 924. The application server then compares the first encrypted token to the second encrypted token in step 926. If the tokens match, the communication is authentic and the server allows the connection step 928; otherwise, the server rejects the communication if the tokens do not match in step 930.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An authentication process for authenticating communications between a user using a client and an application server over a network coupled to a biometrics server comprising the steps of:
   a) generating, by a biometrics server, a unique hash based on biometrics information relating to the user;
   b) sending, by the biometrics server, the unique hash to the client and the application server;
   c) sending, by the application server to the client, an unencrypted token;
   d) encrypting, by the client, a first encrypted token using the unique hash and the unencrypted token;
   e) sending, by the client to the application server, the first encrypted token;
   f) encrypting, by the application server, a second encrypted token using the unique hash and the unencrypted token generated by application server;
   g) comparing, on the application server, the first encrypted token to the second encrypted token; and
   h) authenticating, by the application server, said communications if the first encrypted token and the second encrypted token match.

2. The authentication process of claim 1 wherein the steps are stored as computer-executable instructions in at least one tangible, non-transitory computer-readable medium.

3. The authentication process of claim 2 wherein the user has a user device that generates wellness data regarding the user.

4. The authentication process of claim 3 further comprising the step of sending, from the user device, the wellness data to the biometrics server.

5. The authentication process of claim 4 wherein the biometrics server uses the wellness data to generate the biometrics information.

6. The authentication process of claim 5 wherein the biometrics server uses the wellness data to generate the biometrics information.

7. The authentication process of claim 6 wherein the user device is a smart phone.

8. The authentication process of claim 7 wherein the smart phone receives wellness data from a wearable device worn by the user.

9. The authentication process of claim 8 wherein the wearable device is a smart watch.

10. A biometrics session token generating process for securing communications with a user comprising the steps of:
   a) receiving, by a client application, credentials from the user;
   b) providing, by the client application to an application server, the credentials plus a client secret;
   c) authenticating, by the application server, based on the credentials and the client secret;
   d) generating, by the application server, an unencrypted token;
   e) sending, by the application server to the client application, the unencrypted token;
   f) generating, by a user device, biometrics information regarding the user;
   g) sending, by the user device to the biometrics server, user identification and the biometrics information;
   h) sending, by the application server to the biometrics server, a query with the client secret;
   i) sending, from the biometrics server to the application server, hashed data based on the biometrics information;
   j) encrypting, by the application server, the unencrypted token with the hashed data into a first encrypted token;
   k) encrypting, by the client application, the unencrypted token with the hashed data into a second encrypted token;
   l) sending, by the client application to the application server, the second encrypted token;
   m) comparing, by the application server, the first encrypted token to the second encrypted token;
   n) authenticating, by the application server, the communications if the first encrypted token and the second encrypted token match.

11. The biometrics session token generating process of claim 10 wherein the steps are stored as computer-executable instructions in at least one tangible, non-transitory computer-readable medium.

12. The biometrics session token generating process of claim 11 wherein the user has a user device that generates wellness data regarding the user.

13. The biometrics session token generating process of claim 12 further comprising the step of sending, from the user device, the wellness data to the biometrics server.

14. The biometrics session token generating process of claim 13 wherein the biometrics server uses the wellness data to generate the biometrics information.

15. The biometrics session token generating process of claim 14 wherein the biometrics server uses the wellness data to generate the biometrics information.

16. The biometrics session token generating process of claim 15 wherein the user device is a smart phone.

17. The biometrics session token generating process of claim 16 wherein the smart phone receives wellness data from a wearable device worn by the user.

18. The biometrics session token generating process of claim 17 wherein the wearable device is a smart watch.

19. An authentication machine for authenticating communications with a user using a client, said client coupled to a network, and a biometrics server coupled to the network, said authentication machine comprising:
   a) an application server coupled to the network that contains a tangible, non-transitory computer-readable medium storing computer-executable instructions and a computer processor for executing said instructions stored thereon;
   b) unique hash receiving instructions, stored on the computer-readable medium, for receiving a unique hash from the biometrics server, said unique hash based on biometrics information relating to the user;
   c) unencrypted token instructions, stored on the computer-readable medium, for generating an unencrypted token and sending the unencrypted token to the client;
   d) encryption receiving instructions, stored on the computer-readable medium, for receiving a first encrypted token from the client, said first encrypted token encrypted based on the unique hash and the unencrypted token;
   e) encryption generating instructions, stored on the computer-readable medium, for generating a second encrypted token using the unique hash and the unencrypted token;
   f) comparison instructions, stored on the computer-readable medium, for comparing the first encrypted token and the second encrypted token; and
   g) authentication instructions, stored on the computer-readable medium, for authenticating said communications if the first encrypted token and the second encrypted token match.

20. The authentication machine of claim 19 further comprising an application database for storing the unique hash received from the biometrics server.

* * * * *